United States Patent [19]

Tokushuku et al.

[11] Patent Number: 4,991,163
[45] Date of Patent: Feb. 5, 1991

[54] OPTICAL INFORMATION MEDIUM WITH SAMPLE MARK AREA AND MULTIPLE TRANSCRIPTION PREVENTION

[75] Inventors: Nobuhiro Tokushuku, Yokohama; Hitoshi Yanagihara, Kamakura; Katashi Hazama, Zushi; Masaki Yoshii, Yokohama; Naotake Ebinuma, Hayamamachi, all of Japan

[73] Assignee: Hitachi, Ltd., Tokyo, Japan

[21] Appl. No.: 153,004

[22] Filed: Feb. 8, 1988

[30] Foreign Application Priority Data

Feb. 27, 1987 [JP] Japan .................. 62-42522

[51] Int. Cl.$^5$ .......................... G11B 7/24; G11B 7/013
[52] U.S. Cl. .................... 369/275.4; 369/275.3; 369/44.34
[58] Field of Search ............... 369/275.4, 284, 288, 369/286, 109, 44.34, 275.3; 346/135.1, 76 L

[56] References Cited

U.S. PATENT DOCUMENTS

| | | | |
|---|---|---|---|
| 4,748,609 | 5/1988 | Yonezawa et al. | 369/275 |
| 4,779,253 | 10/1988 | Getreuer et al. | 369/109 |
| 4,807,210 | 2/1989 | Kaku et al. | 369/109 |

FOREIGN PATENT DOCUMENTS 0100995  2/1984  European Pat. Off. ............ 369/275
3722078  7/1987  Fed. Rep. of Germany .
58-41446  3/1983  Japan .................. 369/109
61-156031 7/1986  Japan .

OTHER PUBLICATIONS

Nagashima et al, Experimental estimation of an optical disc sys. with V-shaped grooves, Appl. Phys. Lett. 43(1), 7/1/83, pp. 4-6.

Primary Examiner—Stuart S. Levy
Assistant Examiner—Hoa Nguyen
Attorney, Agent, or Firm—Antonelli, Terry, Stout & Kraus

[57] ABSTRACT

An optical disc consists of a base plate, a reflective thin layer, and a protective thin layer. The optical disc has a sample mark area having two sample marks, one of which is off-set on one side of a track, another of which is off-set at an opposite side of a track. These sample marks are produced by an injection molding with replica technique. At the time of the injection molding, additional pressure moves soft injected plastic resin, which causes double transcription of the sample marks. For preventing the double transcription, groove areas are provided on opposite sides of the sample mark area. The groove areas provide an anchor effect at the time of injection molding.

8 Claims, 3 Drawing Sheets

OPTICAL INFORMATION MEDIUM WITH SAMPLE MARK AREA AND MULTIPLE TRANSCRIPTION PREVENTION

BACKGROUND OF THE INVENTION

The present invention relates to an optical information medium which is capable to record/reproduce an information optically, especially for being capable to obtain a sufficient signal.

Two kinds of tracking servo method are known, one of which is a continuous groove servo method, and another of which is a sample servo method as shown in U.S. Pat. No. 4,402,061. The continuous groove servo method has already been used in products. The sample servo method is recently developed because of a good tracking stability.

As shown in attached FIG. 1A, the sample servo method does not use guiding grooves for tracking, but use a pair of smaple marks 10, 11 for tracking. The pair of sample marks are located on opposite side of the imaginary track with slight off-set. A center line of the imaginary track is indicated as a chain line. The accurate tracking of the imaginary track has been done by detecting each sample mark. In FIG. 1A, a reference numeral 12 indicates pits for clocks. A reference numeral 1 indicates a replica base plate made of, for example, plastic. FIG. 1A is a typical plan view, and FIG. 1B is a typical cross sectional view along line 1B—1B in FIG. 1A. The length of each of pits 10, 11, 12 is 90 ns on a time axis, which corresponds to 0.5 $\mu$m in case of 1800 rpm of revolution number of the optical disc, and pits located at a position of the radius of 30 mm of the optical disc. Optical depth of each of pits 10, 11, 12 is $\lambda/4$, where $\lambda$ is a wavelength of a laser beam for recording/reproducing, and 830 nm is normally used. The sample mark portions shown in FIG. 1A are necessary to 1000 to 3000 portions on each imaginary track. In one embodiment, the number of the sample mark portions are selected to 1376 portions on each track. In other area, there are sector address portions which are located 30 portions on each track. The remaining areas excepting the sample mark portions and sector address portions are mirror areas which are used for recording some information or data. Therefore, the area occupied by some pits of sample marks and sector address is about 10% of total area of the optical disc.

The inventors tried to manufacture the optical disc for the sample servo method by normal injection molding technique, but the ghost pits 10a, 11a, 12a shown in FIG. 2 are produced by double transcription for the original pits 10, 11, 12. In a worst case, triple or quardruplex transcription occurred. The double transcription has a bad influence on tracking signal, and causes a problem of abnormal tracking. In FIG. 2, imaginary center lines of tracks are omitted.

SUMMARY OF THE INVENTION

An object of the present invention is to provide an optical disc which can be obtained a good tracking signal without producing double transcription described above.

In accordance with the present invention, the double transcription is prevented by providing grooves or pits inside the area and outside the area of a track area having sample marks, and also in the neighboring area of the track area.

The inventors grasped a phenomenon of the double transcription, and assumed reasons thereof, and then found out that the grooves or pits provided inside and outside of the track area are effective for stopping movement of plastic resin at the time of injection molding. FIG. 3 shows an imaginary plan view of an optical disc which was first manufactured by the inventors. A reference numeral 18 indicates an inner circle of a diameter of 15 mm. Hatched portion having a reference numeral 16 indicates a sample mark area. A reference numeral 17 indicates an inner mirror area. Reference numeral 15 indicates an outer mirror area. An outer diameter of the optical disc is 130 mm.

When the optical disc shown in FIG. 3 was manufactured by injection molding, the double transcription occurred mainly at inner and outer areas of the sample mark area 16 of the disc 1, especially at boundary areas with the inner mirror area 17 and the outer mirror area 15. This phenomenon hardly occurred at the ordinary disc having grooves or pits on the whole surface of the disc. However, the phenomenon occurred at the disc for the sample servo method. As described above, a ratio occupying sample mark itself on the whole surface is small as about 10%, the remaining parts are mirror face. Therefore, the inventors considered that, at the time of injection molding, the plastic resin moves easily, and the double transcription occurred.

The inventors paid their attention to the phenomenon that the double transcription occurred at the inner and outer areas of the sample mark area, and they considered a mechanism of occurring the double transcription as follows.

FIG. 4 shows an imaginary cross sectional view of a metal mold for the injection molding. Reference numerals 21 and 22 indicate the metal molds. A reference numeral 23 indicates a stamper. A reference numeral 24 indicates a cavity of the metal mold. FIG. 5 shows an imaginary state at the time of injecting resin into the cavity 24 of the metal mold. After injecting, the resin begins to become hard from hatched portions having a reference numeral 25, the resin locating portions indicated by a reference numeral 26 keep a comparatively soft state. At this state, for preventing a reverse of the resin through an injection aperture, a predetermined pressure is applied through the aperture as shown in FIG. 5, and then movement of the resin at the portions 26 where the resin is kept soft occurs, and causes the double transcription. Since the portions 26 are located at the inner and outer area in the cavity, the double transcription occurred at the inner and outer area of the disc. On the other hand, in case of an optical disc having grooves or pits almost on the entire surface of the disc, the double transcription never occured under the state shown in FIG. 5. The slight unevenness of the grooves or pits have a function for preventing movement of resin, even if, the pressure is applied when the resin is still soft, and thereby serve for preventing a generation of the double transcription. In case of the optical disc for the sample servo method, since only a limited number sample mark pits are provided, the effect for preventing the resin movement described above is very small, and the double transcription occurred.

As a result of the investigation described above, the present inventors found out that the double transcription can be prevented by forming grooves or pits at the portions 26 where the resin is kept soft, which have an effect of stopping a movement of the resin.

DETAILED DESCRIPTION OF THE PREFERRED EMBODIMENTS

An embodiment of the present invention is described hereinafter with reference to the attached drawings.

Figure 6:
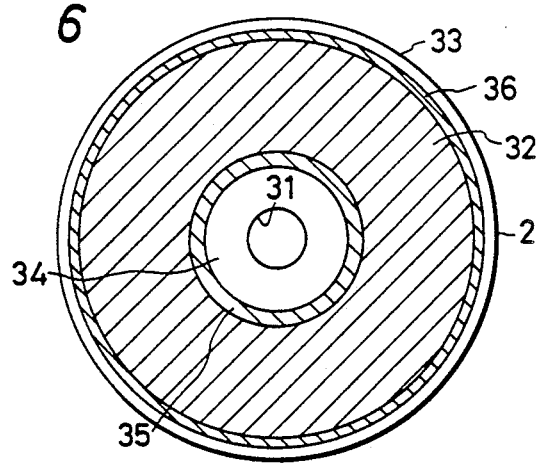
FIG. 6 illustrates an imaginary plan view of an optical disc of the present invention.
Figure 7:
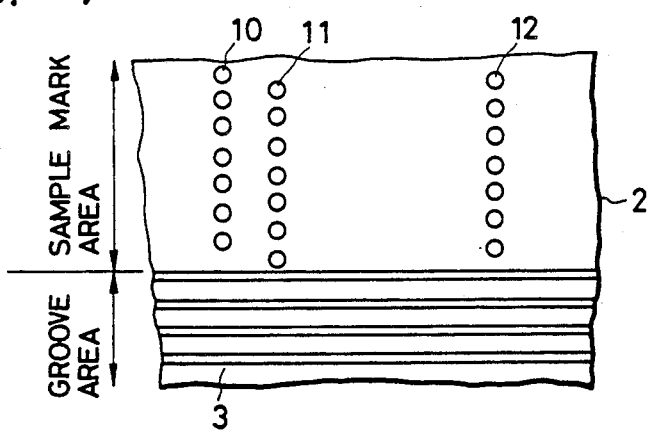
FIG. 7 illustrates a typical plan view of an embodiment of the present invention.

FIG. 6 shows a plan view of an optical disc of an aembodiment of the present invention. In FIG. 6, a replica base plate 2 is made of polycarbonate. The inner diameter 31 of the replica base plate 2 is 15 mm, the outer diameter of it is 130 mm, and the thickness of it is 1.2 mm. A sample mark area 32 is provided from the radius of 29 mm to the radius of 61 mm. Data is recorded on the sample mark area 32. In this present invention, groove areas 35, 36 are provided adjacent to and inside and outside of the sample mark area 32 with a width of 1 mm. The reference numerals 33, 34 indicate mirror areas. FIG. 7 shows an expanded plan view of a boundary portion of the sample mark area 32 and the groove area 35. In FIG. 7, the reference numerals 10, 11 indicate the sample mark pits. The refrence numeral 12 indicates the clock pits. The reference numeral 3 indicates the grooves having an optical depth of about λ/4, a width of 0.5 μm, a pitch of 1.5 μm. In case that a light having a wavelength of 830 nm and the polycarbonate having an index of refraction of 1.5 are used, λ/4 corresponds to 138 nm. In the groove area, 666 lines of grooves are provided.

The boundary portion of the sample mark area 32 and the groove area 36 is constructed the same as shown in FIG. 7. The grooves provided at the inner and outer area of the sample mark area 32 causes an anchor effect at the time of injection molding. In the present embodiment, the condition of the injection molding is a resin temperature of 340° C., a temperature of the metal mold of 90° C., an injection speed of 100 mm/sec, an adding pressure of 100 kg/cm². These condition may be changed by kinds of injecion molding machines.

Figure 8:
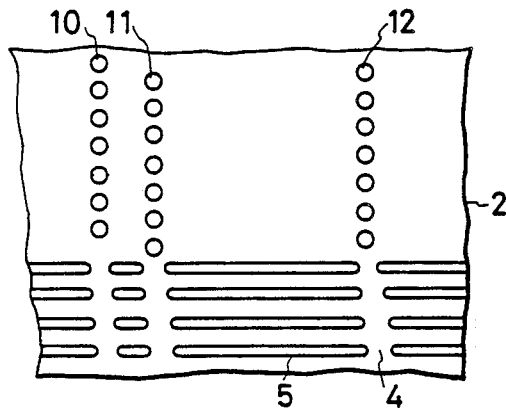
FIG. 8 illustrates a typical plan view of another embodiment of the present invention.

FIG. 8 shows another embodiment of the present invention. Instead of continuous grooves 3 shown in FIG. 7, grooves 5 separated by mirror portion 4 can also be used for preventing the double transcription.

Figure 9:
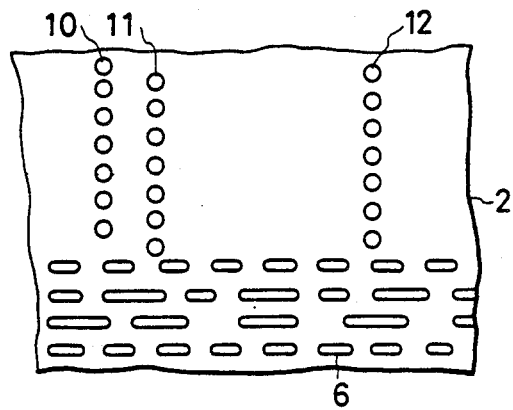
FIG. 9 illustrates a typical plan view of still another embodiment of the present invention.

FIG. 9 shows still another embodiment of the present invention. In this embodiment, a large number of pits 6 is used for preventing the double transcription.

The optical depth of the grooves is not limited only to λ/4 as described in the embodiment, but the grooves having optical depth of more than 10 nm can also be act as the anchor at the time of the injection molding. The width of the grooves or pits is desirably selected from 0.1 μm to 5 μm. The track pitch is also desirably selected from 1 μm to 10 μm.

The space between the sample mark area and the grooves or pits area is not limited to a track pitch which is 1.5 μm, but the space of less than 0.5 mm can also be act as the anchor.

The width of the grooves or pits area is not limited only to 1 mm, but the width of more than 0.1 mm can also be act as the anchor.

The optical recording disc is manufactured by following process.

(Laser cutting)

A photoresist layer coated on a glass plate is irradiated by pulse modulated laser beam. A laser cutting machine is known as shown in , for example, U.S. Pat. No. 4,456,914. The laser beam is modulated as that, at the portion of the sample marks 10, 11, the clock pits 12, and the grooves 3, the laser beam irradiates the photoresist layer, and at the remaining portion, the laser beam does not irradiate the photoresist layer. Exposed photoresist layer is developed and removed.

(Master and stamper)

The glass plate on which the photoresist layer remains partially is coated with silver or nickle. On the silver or nickle layer coated on the glass plate, the nickle layer is formed by an electroforming with a thickness of about 0.2 mm. The electroforming nickle layer separated from the glass plate is called a master plate. On the the master plate, a nickle layer is formed by an electroforming with a thickness of about 0.2 mm. This nickle layer separated from the master plate is called a mother plate. Several mother plates are obtained from one master plate. On the mother plate, a nickle layer is formed by an electroforming. This nickle layer separated from the mother plate is called a stamper. Several stampers are obtained from one mother plate.

(Injection molding)

Figure 1A:
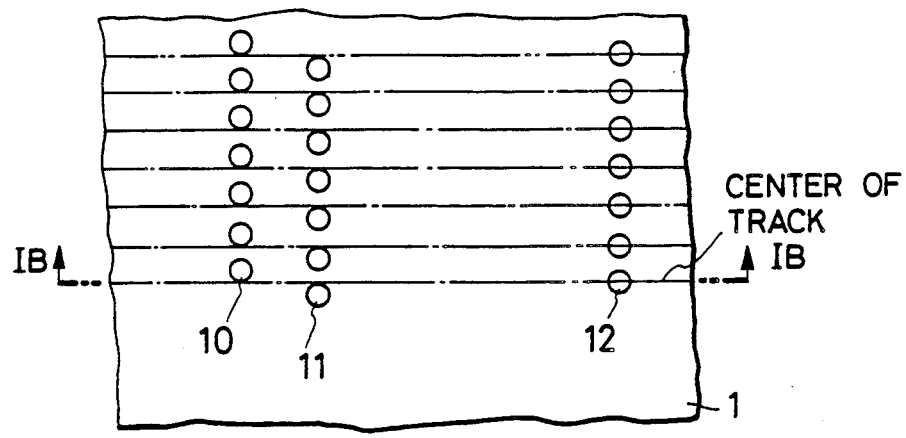
FIG. 1A illustrates a conventional plan view of an optical disc using the sample servo method.
Figure 1B:
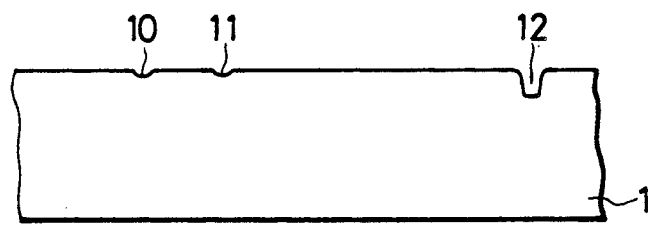
FIG. 1B illustrates a cross sectional view of FIG. 1A.
Figure 2:
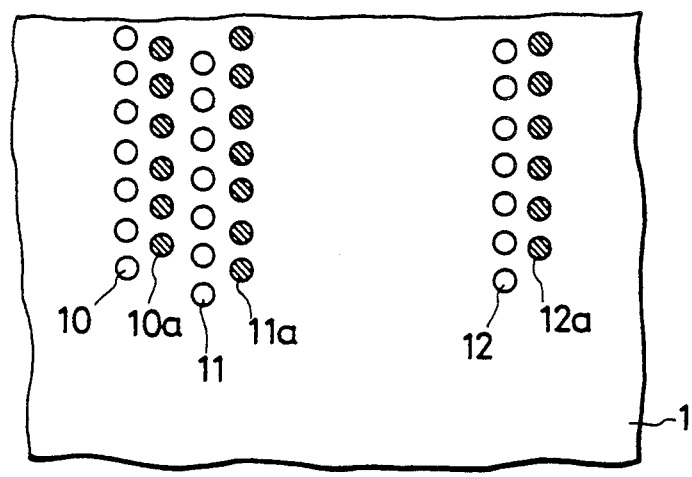
FIG. 2 illustrates a conventional plan view of the optical disc showing double transcription of pits.
Figure 3:
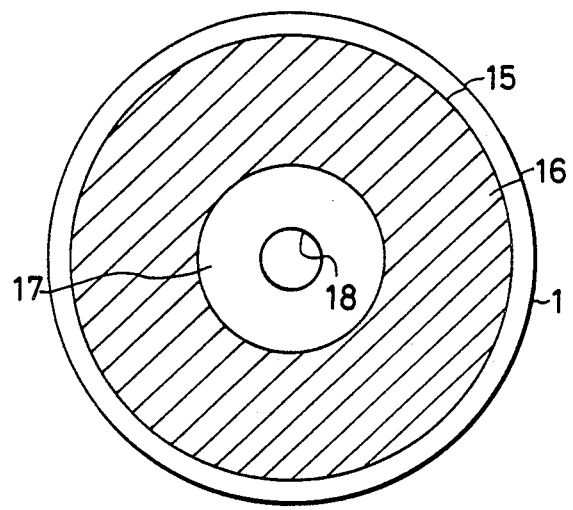
FIG. 3 illustrates an imaginary plan view of the optical disc.
Figure 4:
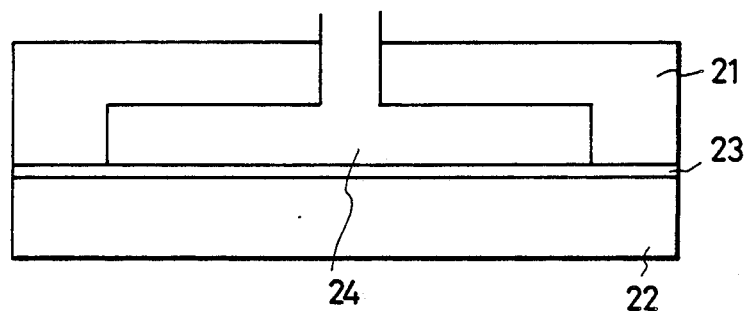
FIG. 4 illustrates an imaginary cross sectional view of a metal mold.
Figure 5:
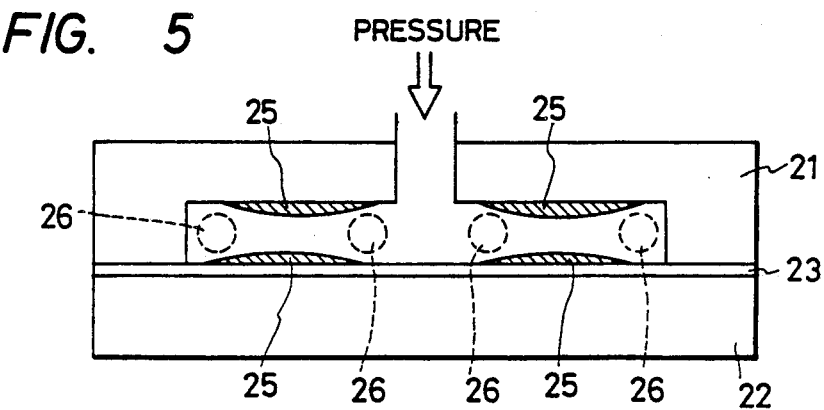
FIG. 5 illustrates a state at the time of injecting plastic resin into the metal mold shown in FIG. 4.

The stamper is set in the metal mold for injection molding as shown in FIG. 4. Melting plastic resin, for example, polycarbonate, is injected into the metal molding cavity for making a replica.

(Optical recording medium)

On the replica, a recording layer is formed by sputtering. As materials used for the recording layer, Bi-Se-As described in Japanese patent application No. 61-156031 filed on July 4, 1986 can be used. Corresponding German patent application No. P 37 22 078.0 was filed on July 3, 1987. Also a corresponding U.S. patent application Ser. No. 66,958 was filed on June 29, 1987. On the recording layer, a protective layer is coated.

According to the present invention, it can be obtained the replica base plate for the sample servo method having a good stability of tracking, because the double transcription of the sample marks can be prevented.

What is claimed is:

1. An injected molded optical information medium formed or injected soft material comprising an optical disc with first, second and third areas radially arranged so that said first and third areas are disposed respectively radially inwardly and radially outwardly of said second area, said second area being a sample mark area including at least one circumferentially extending track containing a plurality of spaced sample mark portions disposed along the track, each sample mark portion including at least two sample mark pits, one of the sample mark pits being slightly off-set on one side of the track, and the other of the sample mark pits being slightly off-set at an opposite side of the track and means for stopping movement of the soft injected material forming the optical information medium during injection molding so as to prevent multiple transcription of the sample mark pits in the sample area, said means for stopping movement being groove areas including a plurality of uneven tracks provided in said first and second areas.

2. The optical information medium according to claim 1, wherein at least one of said uneven tracks is a continuous groove.

3. The optical information medium according to claim 1, wherein at least one of said uneven tracks is an interrupted groove including a mirror portion at the interruption.

4. The optical information medium according to claim 1, wherein at least one of said uneven tracks is a row of pits.

5. The optical information medium according to claim 1, wherein a depth of at least one of said uneven tracks is more than 10 nm.

6. The optical medium according to claim 1, wherein a width of at least one of said uneven tracks is from 0.1 $\mu$m.

7. The optical information medium according to claim 1, wherein a pitch of said uneven tracks is from 1 $\mu$m to 10 $\mu$m.

8. The optical information medium according to claim 1, wherein a width of at least one of said uneven tracks is more than 0.1 $\mu$m.

* * * * *